Figure 1:
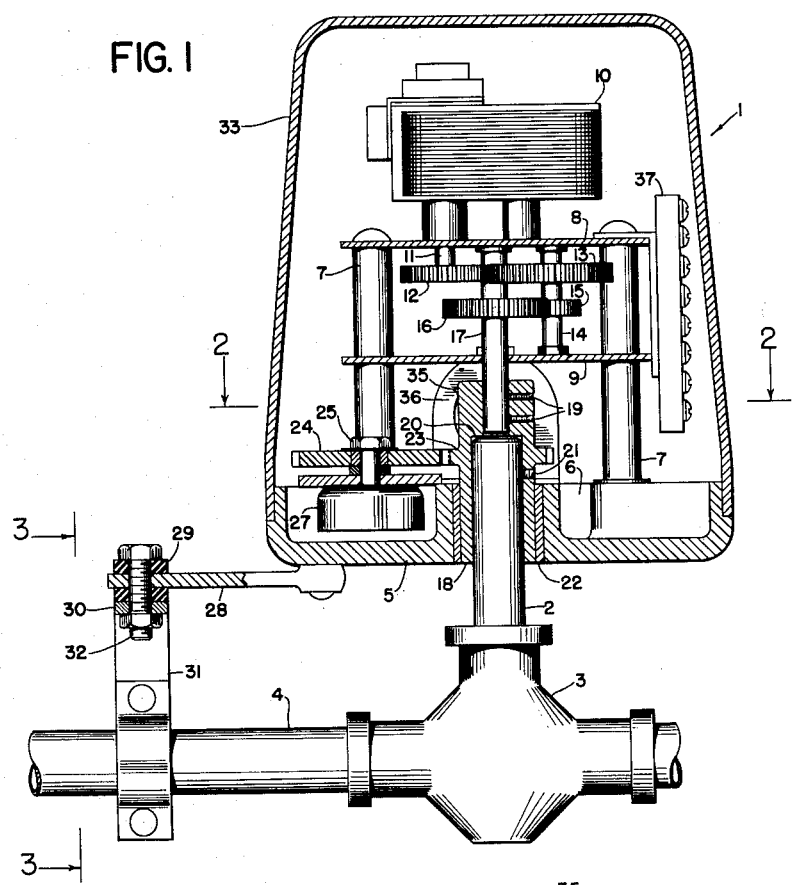

Aug. 1, 1961 C. E. JORDAN 2,994,794
CONTROL APPARATUS
Filed June 13, 1957 2 Sheets-Sheet 1

INVENTOR.
CHARLES E. JORDAN

BY Andrus, Sceales & Starke

Attorneys

Aug. 1, 1961 C. E. JORDAN 2,994,794
CONTROL APPARATUS
Filed June 13, 1957 2 Sheets-Sheet 2

INVENTOR.
CHARLES E. JORDAN
BY Andrus, Sceles & Starke
Attorneys

United States Patent Office  
2,994,794  
Patented Aug. 1, 1961

2,994,794
CONTROL APPARATUS
Charles E. Jordan, Shorewood, Wis., assignor to Jordan Controls, Inc., Milwaukee, Wis., a corporation of Wisconsin
Filed June 13, 1957, Ser. No. 665,521
2 Claims. (Cl. 310—68)

This invention relates to an apparatus for controlling the movement of a movable element, and more particularly to a control apparatus supported by the movable element and including a feed-back mechanism adapted to establish a signal in response to movement of the element.

The present invention is directed to a control apparatus to be supported by a movable element, such as a drive shaft, valve stem, crank shaft, plunger rod, etc., and includes a drive mechanism which serves to actuate the element in response to an electrical signal supplied to the apparatus. The movement of the drive mechanism is transmitted to a feed-back mechanism which establishes a control signal in accordance with movement of the drive mechanism.

In a simple form, the apparatus includes a base or frame which is carried by a rotatable member connected to an element to be controlled. The frame supports a servo motor and the drive shaft of the motor is connected through suitable reduction gearing to the rotatable member so that rotation of the drive shaft is transmitted to the member to rotate the same and control the element.

The motor is connected in a control circuit and is operated in either a forward or reverse direction by manual or automatic closing the circuit to rotate the member.

In one embodiment of the invention, the feed-back mechanism comprises a potentiometer or other variable impedance device which is supported by the frame and is connected in the same or a second control circuit. Rotation of the drive mechanism varies the resistance of the potentiometer and establishes an operating signal in the control circuit.

In a modified form of the invention, the feed-back mechanism establishes a control signal through an electromechanical system in which the rotation of the drive mechanism is converted into a series of electrical pulses by a pulse generating device. The pulse generating device is connected in an operating circuit and the pulses serve to control the circuit.

To compensate for non-concentricity of the controlled element, the frame is resiliently connected through a torque arm to an outside object.

The present invention provides a simple and inexpensive control apparatus which is readily adaptable for use with both new and existing elements to be controlled. The apparatus is extremely compact with the motor, gearing and feed-back mechanism all contained within the housing and supported by the controlled element.

Other objects and advantages will appear in the course of the following description.

The drawings illustrate the best mode presently contemplated of carrying out the invention.

Figure 3:
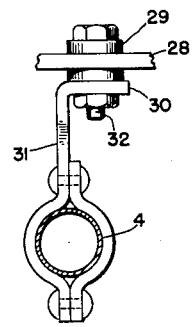
Figure 2:
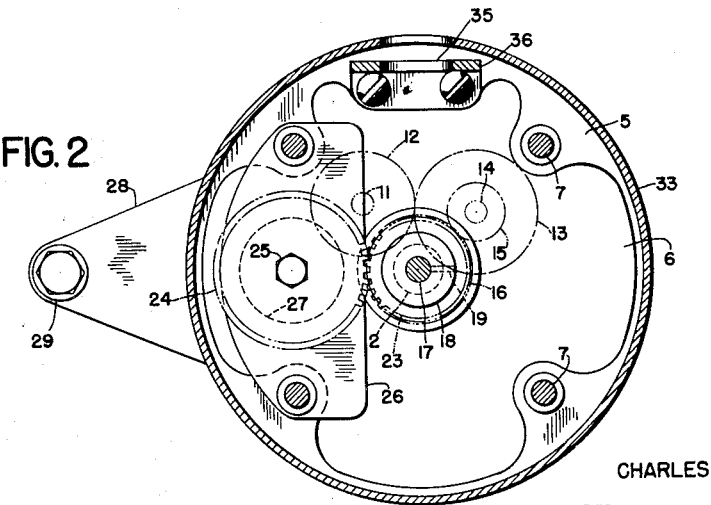
Figure 4:
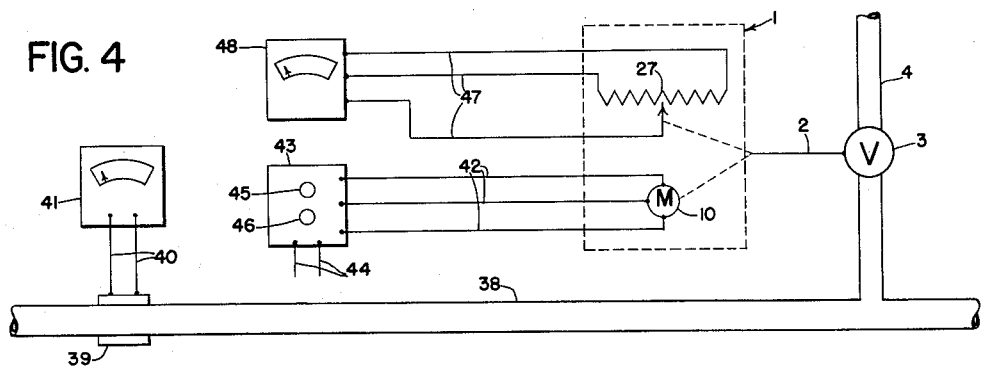
Figure 5:
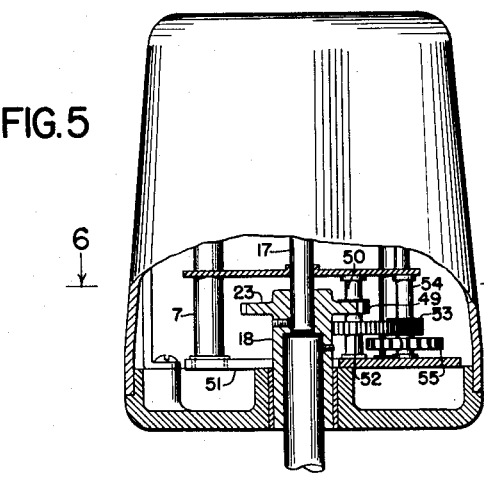
Figure 6:
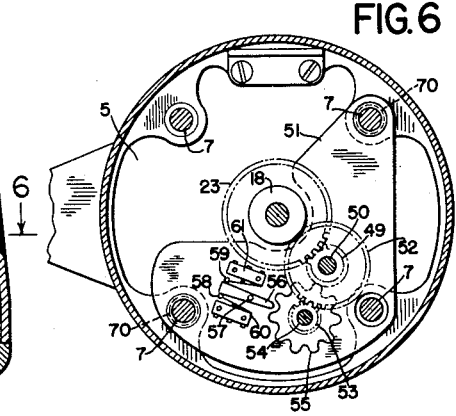
Figure 7:
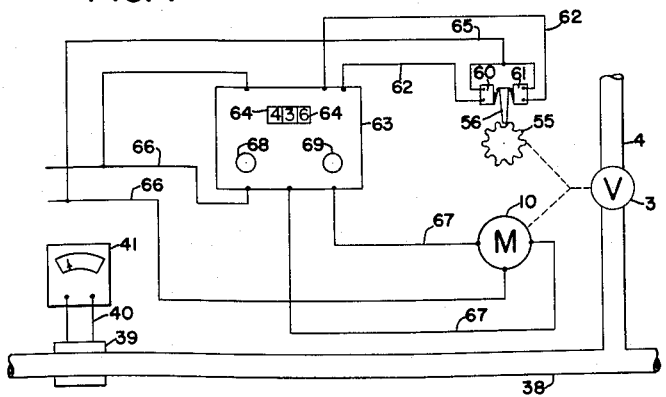

In the drawings:
FIGURE 1 is a vertical section of the apparatus of the invention;
FIG. 2 is a transverse section taken along line 2—2 of FIGURE 1;
FIG. 3 is a view taken along line 3—3 of FIGURE 1;
FIG. 4 is a diagrammatic showing of an electrical circuit incorporating the present invention;
FIG. 5 is a side elevation of a modified form of the invention with parts broken away in section;
FIG. 6 is a transverse section taken along line 6—6 of FIG. 5; and
FIG. 7 is a diagrammatic showing of an electrical circuit incorporating the structure shown in FIGS. 5 and 6.

The drawings illustrate a control device 1 for actuating a movable element which includes a built-in feed-back mechanism adapted to establish a signal in response to movement of the element.

For purposes of illustration, the control apparatus 1 shown in the drawings is associated with a valve stem 2 of a conventional non-rising stem valve 3 which is adapted to control the flow of fluid passing through a pipe line or conduit 4. However, it is contemplated that the control apparatus can be employed with other rotating or linear moving elements, such as a pinion shaft, rheostat, damper, plunger rod, etc., to control the movement of these elements.

The control apparatus 1 comprises a generally circular base 5 which is provided with a central recess 6. A series of columns 7 are mounted on the base 5 and extend upwardly therefrom and carry a pair of spaced plates 8 and 9.

The drive mechanism for rotating the valve stem 2 comprises a conventional servo motor 10 which is mounted on the upper plate 8, and the drive shaft 11 of motor 10 extends through a suitable opening in plate 8 and is journaled therein.

Rotation of drive shaft 11 is transmitted through suitable reduction gearing to the valve stem 2 to thereby rotate the valve stem in accordance with rotation of drive shaft 11. To this end the drive shaft 11 carries a gear 12 which meshes with a gear 13 secured to shaft 14. The shaft 14 is suitably journaled between the spaced plates 8 and 9.

A second gear 15 is secured to the shaft 14 and meshes with a gear 16 carried on shaft 17. The shaft 17 is suitably journaled between the plates 8 and 9 and the lower end of shaft 17 extends downwardly through a suitable opening in plate 9 and is received within an axial recess formed in the upper end of sleeve coupling 18. The shaft 17 is secured within the recess in sleeve 18 by set screws 19.

The lower end of sleeve 18 is provided with an axial recess 20 which receives the upper end of valve stem 2. The valve stem 2 is secured within the recess 20 by means of set screw 21. The sleeve 18 is journaled for rotation within a bearing 22 which is secured within a suitable opening formed in base 5.

With this construction, rotation of the drive shaft 11 is transmitted through the gearing arrangement to the shaft 17, and the shaft 17 is connected through the sleeve 18 to the valve stem 2 so that the valve stem 2 will be rotated in accordance with rotation of drive shaft 11 and shaft 17. The number and size of the gears in the gear train will determine the ratio of turns between the drive shaft 11 and the valve stem 2 with the specific ratio of rotation between these members being determined by the particular apparatus to which the rotatable element, such as valve stem 2, is connected.

As shown in FIGS. 1–4, the control apparatus of the invention includes a built-in feed-back mechanism which is adapted to establish an electrical control signal in response to movement of the drive mechanism. The feed-back mechanism includes a gear 23 which is secured to sleeve 18, and the gear 23 meshes with a gear 24 carried by a shaft 25.

The shaft 25 is journaled within a plate 26 which is secured to base 5, and the lower end of shaft 25 is operably connected to a potentiometer 27 or other variable impedance device which is disposed within recess 6 of base 5. With this structure, rotation of sleeve 18 is transmitted through the gears 23 and 24 to vary the resistance of the potentiometer 27 and thereby establish an electrical control signal.

To resiliently support the apparatus 1, the inner end of a torque arm 28 is connected by a suitable screw to the under surface of base 5. The outer end of the torque arm 28 is resiliently connected by means of a rubber or plastic grommet 29 to the upper horizontal flange 30 of a split ring bracket 31 by a bolt 32. The split ring bracket 31 is attached to the conduit 4 or other outside or fixed object. The resilient connection between the apparatus and outside object, such as conduit 4, compensates for non-concentricity in the valve stem or other element to be controlled. This connection, in effect compensates for "run-out" of the shaft and permits the unit to "work."

The drive and feed-back mechanisms of the apparatus are enclosed by a cup-shaped cap 33 which is suitably secured within a recess formed in the periphery of base 5.

Electrical energy is supplied to the unit by the electrical leads, not shown, which are connected to the motor 10 and potentiometer 27 and pass through an opening in the cap 33 and through an aligned opening 35 in an angle-shaped bracket 36 which is secured to base 5. The leads are connected to the terminals on a control panel 37 supported by plate 8, and other suitable leads, not shown, connect the terminals to the motor and potentiometer respectively.

As shown in FIG. 4, the control apparatus 1 is employed in connection with the valve 2 to control the flow of fluid passing within conduit 4. A primary fluid is conducted with a conduit 38 and a secondary fluid is adapted to be introduced into the conduit through conduit 4. The valve 3 controls the rate of flow of the secondary fluid entering conduit 38 through conduit 4.

The rate of flow of fluid passing within conduit 38 is measured by a suitable flow response device 39 which is connected by leads 40 to a meter 41 adapted to indicate the rate of flow.

The motor 10 is connected by leads 42 to the terminals of a control switch 43. Power lines 44 serve to connect the switch 43 to a suitable source of electrical energy, not shown.

To selectively change the direction of rotation of the motor, a forward start button 45 and reverse start button 46 are associated with switch 43 and by depressing either the forward start button or reverse start button the motor windings are energized to drive the motor in a forward or reverse direction respectively.

The potentiometer 27 is connected by leads 47 in series with a meter 48 and a change in the resistance of the potentiometer produces a control signal in the circuit causing meter 48 to indicate the rate of flow of the secondary fluid in conduit 4.

In operation of the system, if fluid is flowing within conduit 38 at a given rate and it is desired to introduce the secondary fluid through conduit 4 into the conduit 38 at a given proportional rate of flow, the operator engages one of the buttons 45 and 46 to actuate the motor and open the valve. Rotation of the drive mechanism is transmitted through the feed-back mechanism to vary the resistance of the potentiometer 27 and thereby provide an indication on the dial of the meter 48 as to the rate of flow of the fluid within the conduit 4.

While the above system is directed to a manual operation, it is contemplated that the control apparatus of the invention may be incorporated in an automatic system whereby a signal is adapted to control the operation of the motor to automatically open and close the valve.

In a modified form of the invention, shown in FIGS. 5–7, the feed-back mechanism establishes a control signal through an electro-mechanical system in which rotation of the drive mechanism is converted into a series of electrical pulses by a pulse generating device.

In this embodiment, gear 23, which is attached to sleeve coupling 18, meshes with gear 49 which is secured to shaft 50. The ends of shaft 50 are journaled within suitable bearings secured to plate 9 and to plate 51 which is secured to base 5.

Shaft 50 carries a gear 52 which meshes with gear 53 on shaft 54, and shaft 54 carries a gear 55. The teeth of gear 55 are adapted to be engaged by a pivotable finger 56 which is fulcrumed about pin 57 extending upwardly from plate 51. As gear 55 rotates, the finger is pivoted about pin 57 and successively engages the teeth of the gear. As the finger 56 is pivoted by successive engagement with each tooth of gear 55, the outer end of the finger momentarily engages one of the roller arms 58 and 59 of normally open limit switches 60 and 61. For example, as the gear 55 rotates in a clockwise direction, as shown in FIG. 6, the teeth on the gear successively engage the end of finger 56 and pivot the finger counterclockwise about pin 57. A counterclockwise pivotal movement of finger 56 momentarily trips roller arm 58 of limit switch 60 to momentarily close the switch and produce a train of electrical pulses in a control circuit. Conversely, if gear 55 is rotated in the opposite direction, the finger 56 is pivoted clockwise to momentarily trip roller arm 59 and close switch 61 to establish a series of electrical pulses in a second circuit. As shown in FIG. 7, the limit switches 60 and 61 are connected by leads 62 in series with a conventional counting mechanism 63 which includes a plurality of rotatable drums 64 having indicia or numbers thereon. The limit switches 60 and 61 are also connected by a common lead 65 to one of the power lines 66 which are connected to the counting mechanism 63 and to motor 10. The motor 10 is also connected by leads 67 to the counting mechanism. With this circuitry, a momentary closing of limit switch 60 will close the circuit to the counting mechanism and rotate the numbered drums in one direction, while a momentary closing of limit switch 61 will close the circuit to rotate the drums in the opposite direction.

To selectively change the direction of rotation of the motor, a forward start button 68 and a reverse start button 69 are associated with the counting mechanism 63, and by depressing either the forward start button or reverse start button, the motor windings are energized to drive the motor in a forward or reverse direction, respectively. Reversing the direction of motor rotation reverses the rotation of gear 55 and causes finger 56 to close the opposite limit switch. This in turn changes the direction of rotation of drums 64.

The gearing arrangement of the feed-back mechanism of the structure shown in FIGS. 5–7 is designed so that one revolution of the drive shaft 17 will produce a substantial number of momentary trips of the roller arms 58 and 59 and electrical pulses in the control circuits. For example, by the proper gear ratios, one revolution of output shaft 17 may result in one thousand pulses or momentary actuations of the limit switches 60 and 61. Each pulse or momentary closing of the limit switches 60 and 61 produces a resulting change in the numbered total on the counting drums 64. As the limit switch 60 is closed, the numbered total on the drums 64 is correspondingly increased, while each momentary closing of the limit switch 61 will result in a decrease in the total showing on the drums.

As the ratio between the number of pulses and the number of revolutions of shaft 17 is very great, this results in a very accurate indication of the degree of rotational movement of shaft 17 and valve stem 2.

The operation of the system shown in FIGS. 5–7 is similar to that shown in the first embodiment. When the rate of flow through conduit 4 is to be increased or decreased, the operator engages one of the buttons 68 and 69 to actuate the motor to either open or close the valve 3. Rotation of the drive mechanism is transmitted through the feed-back mechanism to close either limit switch 60 or 61 and thereby provide an indication of the flow on the counting mechanism 63.

While the above system is directed to manual operation, it is contemplated that the control apparatus may be corporated in an automatic system whereby the signal established by closing of the limit switches 60 and 61 may control the operation of the motor 10 to automatically open or close the valve 3.

To provide a degree of adjustment for the gears 49, 52, 53 and 55 so that the gears will mesh firmly together and provide an accurate feed-back signal, the plate 51 is connected to the base 5 by columns 7 which extend through suitable openings in the plate 51, and are threaded into the base. To adjust the position of plate 51 and thereby selectively change the position of the axis of the gear shafts 50 and 54 in the feed-back mechanism, the diametrically opposite columns 7 which are associated with the ends of plate 51 pass through enlarged holes 70 in plate 51 which provide a certain amount of play or movement for the plate. By loosening the columns 7 and shifting the position of the plate 51, the engagement of the gears in the feed-back mechanism can be selectively tightened or loosened as desired.

While the present disclosure is directed to the use of the control apparatus associated with a vertically disposed valve stem, it is contemplated that the unit may be applied to any rotating or linear moving element to control the action of the same. Similarly, the unit may be disposed horizontally or in any other desired angle which will correspond to the position of the element to be controlled.

The present control device is a simple and compact unit in which the drive mechanism and feed-back mechanism are both contained within a single housing supported by the control element.

Various modes of carrying out the invention are contemplated as being within the scope of the following claims particularly pointing out and distinctly claiming the subject matter which is regarded as the invention.

I claim:

1. A control apparatus for use in controlling the rotation of a rotatable element comprising a supporting member adapted to be carried by the rotatable element, a motor carried by the supporting member and having a drive shaft, a tubular member journaled within an opening in the supporting member and having an axial opening facing outwardly of the supporting member and adapted to receive a rotatable element to be controlled, gear means interconnecting said drive shaft and said tubular member for rotating said tubular member in accordance with rotation of said drive shaft, signalling means supported by the supporting member and connected in a control circuit, and means operably connecting said signalling means and the drive shaft for actuating the signalling means in accordance with rotation of said drive shaft to thereby establish a signal in the control circuit.

2. The structure of claim 1, and including a torque arm interconnecting the supporting member and an outside object.

References Cited in the file of this patent

UNITED STATES PATENTS

| | | |
|---|---|---|
| 786,024 | Gomborrow | Mar. 28, 1905 |
| 845,281 | Tirrill | Feb. 26, 1907 |
| 854,712 | Bassett | May 28, 1907 |
| 2,276,195 | Holmes | Mar. 10, 1942 |
| 2,531,241 | Witts | Nov. 21, 1950 |
| 2,583,747 | Potter | Jan. 29, 1952 |
| 2,628,333 | Maltby | Feb. 10, 1953 |
| 2,682,628 | Jordan | June 29, 1954 |
| 2,815,501 | Benson et al. | Dec. 3, 1957 |